United States Patent
Werry et al.

(10) Patent No.: US 11,859,489 B2
(45) Date of Patent: Jan. 2, 2024

(54) ACOUSTIC IMAGING AGENT

(71) Applicant: Powdermet, Inc., Euclid, OH (US)

(72) Inventors: Brian S. Werry, Euclid, OH (US); Brian Doud, Cleveland Heights, OH (US); Andrew Sherman, Mentor, OH (US)

(73) Assignee: Powdermet, Inc., Euclid, OH (US)

( * ) Notice: Subject to any disclaimer, the term of this patent is extended or adjusted under 35 U.S.C. 154(b) by 73 days.

(21) Appl. No.: 17/570,133

(22) Filed: Jan. 6, 2022

(65) Prior Publication Data

US 2022/0127954 A1    Apr. 28, 2022

Related U.S. Application Data

(63) Continuation of application No. 15/904,690, filed on Feb. 26, 2018, now Pat. No. 11,268,375.

(60) Provisional application No. 62/469,108, filed on Mar. 9, 2017.

(51) Int. Cl.
| | |
|---|---|
| *E21B 47/107* | (2012.01) |
| *E21B 43/267* | (2006.01) |
| *C09K 8/70* | (2006.01) |
| *C09K 8/03* | (2006.01) |
| *E21B 47/095* | (2012.01) |
| *C09K 8/80* | (2006.01) |

(52) U.S. Cl.
CPC .............. *E21B 47/107* (2020.05); *C09K 8/03* (2013.01); *C09K 8/70* (2013.01); *E21B 43/267* (2013.01); *E21B 47/095* (2020.05); *C09K 8/80* (2013.01)

(58) Field of Classification Search
None
See application file for complete search history.

(56) References Cited

U.S. PATENT DOCUMENTS

| | | |
|---|---|---|
| 3,221,833 A | 12/1965 | Malmberg |
| 3,587,775 A | 6/1971 | Baker |
| 3,718,205 A | 2/1973 | Fahr et al. |
| 3,909,776 A | 9/1975 | Bowling et al. |
| 4,038,631 A | 7/1977 | Murphy |
| 4,805,726 A | 2/1989 | Taylor et al. |
| 2004/0226715 A1* | 11/2004 | Willberg ................. E21B 47/00 166/308.1 |
| 2012/0048538 A1* | 3/2012 | Brannon .................. G01V 1/40 166/308.1 |
| 2019/0062623 A1 | 2/2019 | Risser et al. |

* cited by examiner

*Primary Examiner* — Jeffrey D Washville
(74) *Attorney, Agent, or Firm* — Ulmer & Berne LLP; Brian E. Turung

(57) ABSTRACT

An imaging agent, a method of production of the imaging agent, and the use of the imaging agent for microseismic monitoring of subterranean formations such as those generated during hydraulic fracturing. The acoustic emitting agent is tailorable for emission delay to ensure placement and frequency emission profiles for well region differentiation. This monitoring tool is highly useful in gas, oil, and geothermal well defining and stimulation monitoring.

11 Claims, 1 Drawing Sheet

ACOUSTIC IMAGING AGENT

The present invention is a continuation of U.S. application Ser. No. 15/904,690 filed Feb. 26, 2018, which in turn claims priority on U.S. Provisional Application Ser. No. 62/469,108 filed Mar. 9, 2017, which is incorporated herein by reference.

The present invention relates to an imaging agent for microseismic monitoring of subterranean formations such as those generated during hydraulic fracturing. The invention pertains to an imaging agent, a method of production of the imaging agent, and the use of the imaging agent. The invention as described herein is applicable to subterranean formation monitoring, and is particularly useful for energy production wells such as oil, gas, and geothermal; however, the invention is also intended for use in other seismic monitoring applications in which is it desirable to know flow passage.

BACKGROUND OF THE INVENTION

Hydraulic fracturing has revolutionized energy production from domestic resources, including tight oil and gas formations, and unlocking geothermal energy. Hydraulic stimulation was first used in the 1940s, but has since evolved and is now an essential technique in the development of oil and gas reserves. These techniques are largely responsible for development of the Barnett Shale, Haynesville Shale, Fayetteville Shale, and Marcellus Shale gas fields. Hydraulic fracturing can also liberate oil from tight rock units as has been done with the Bakken Shale and Niobrara Shale. Estimates reported by The National Petroleum Council expect hydraulic fracturing to eventually account for nearly 70% of natural gas production in North America.

The production of natural gas and oil from North American sources is feeding a manufacturing renaissance and reducing our reliance on foreign sources while facilitating a switch from coal and oil/gasoline to cleaner natural gas. The development of unconventional oil and gas (particularly gas) resources, as well as geothermal energy, remains very expensive and can be repeated multiple times on a well before successful results are realized. Reducing the cost through understanding and optimizing completion operations in hydraulic fracturing is essential for continued development of unconventional energy resources.

Monitoring of microseismic/acoustic events induced by hydraulic stimulation has become a key tool in evaluation of induced fractures. Microseismic technology "listens" to the formation as it is breaking apart during a hydraulic fracture (through the use of sensors such as geophones, fiber optic sensors and accelerometers placed in calibrated sensing arrays along with computer analysis and triangulation algorithms) to give well operators a picture of how a well is fractured, and any faults in the formation. For more advanced applications, microseismic technology it is used to estimate the size and orientation of these induced fractures. The main goal of subterranean fracture monitoring is to completely characterize the induced fracture structure and distribute conductivity of the fractures within a formation. Currently, the monitoring of these forming fractures has been limited to fracture stimulation while the well is actively being pumped. This pumping and formation movement contributes to the active noise down well. The accuracy of microseismic event mapping is dependent on the distribution of sensitive sensors—the resulting signal to noise. Hence, signal resolution can be low and limited to microseismic mapping of active generated fractures, and not to the actual fractures that are maintained by proppant. The next advancement in fracture monitoring and understanding is to know the location of proppant within the fracture and the distribution of fracture conductivity after pumping.

Microseismic monitoring technology, when used in combination with hydraulic fracturing, offers significant value propositions over other methods of learning about a well site. Current advanced tools in seismic recordings are completed with sensitive geophones or with the newer distributed acoustic sensing (DAS). Again, their monitoring of microseismic events can offer low resolution of imaged fractures and only show active fracture formation, and not maintained fractures.

There are existing prior art patents relating to seismic generation for improving seismic mapping of geological formations. U.S. Pat. No. 3,587,775 describes a controlled explosive by using dissociative water's hydrogen and oxygen. U.S. Pat. Nos. 4,038,631; 3,909,776; 3,718,205, and 3,221,833 describe the use of a mechanical impacting device. U.S. Pat. No. 4,805,726 describes a controlled charge for initiating a large hollow vessel implosion. These patents disclose the use of energy from a hydrostatic implosion from the well bore's high pressures to create a seismic source emission. However, the technology taught by the prior art still requires wiring and layering the charge ignition, and is far too large to fit into fractures. Additionally, the production of machining the tool limits its use as a seismic source for only mapping by the interpretation of seismic changes as the signal traverses through the formation to the sensors.

The rupture and implosive collapse of hollow cavities has been utilized in marine studies. Examples of these works include: Orr, M. and Schoenberg, M.'s "Acoustic Signatures From Deepwater Implosions of Spherical Cavities", Journal of Acoustical Society of America, Vol 59, No. 5, pg. 1155 (1976); Reader, W. T. and Chertock, G.'s "Transient Sounds Due to Implosions of Simple Structures Under Hydrostatic Pressure", presented at $82^{nd}$ meeting of Acoustic Society of America (1976); And Urick, R. J. "Implosion as Sources of Underwater Sounds", Journal of Acoustical Society of America, pg. 2026 (1964). The disclosures in the prior art, however, only implode at the first experience of the hollow cavities collapse strength limit under hydrostatic pressure, and are not designed to be able to provide the controlled implosive release of acoustic signal needed in subterranean seismic (microseismic) well monitoring.

SUMMARY OF THE INVENTION

The present invention relates to an imaging agent for microseismic monitoring of subterranean formations, and in particular to formations generated during hydraulic fracturing. The invention as described herein is applicable to subterranean formation monitoring, and is particularly useful for energy production wells, such as oil, gas, and geothermal.

In accordance with the present invention, the microseismic monitoring of a formation can be improved by including an acoustic imaging agent during the fracture packing phase and, after hydraulic fracturing, the acoustic agent will emit signals from within successful packed fracture formations. Mapping the signal of proppant placement and maintained fracture conductivity after fracturing pressures are removed provides an innovative step in understanding well production success and fracturing techniques.

The present invention utilizes the native potential energy of particles that fracture or crush under high hydrostatic pressures deep underground to create a detectable acoustic sound or emission.

The present invention discloses a method for using protected particles as an acoustic imaging agent for fracture mapping in well monitoring. There are three principle value propositions that the present invention offers for geologic energy recovery, namely:

1. Creating a "true" picture of a) how the well was fractures by use of proppant, b) where proppant has gone in the well, c) if a zone was completed correctly; and wherein the information can be used create an active fracture map from the formation's microseismic events during and after hydraulic fracture pumping;

2. Enhancing the "picture" and knowledge of the well formation by increasing the signal-to-noise ratio of microseismic event sensing during well monitoring; and 3. Lowering the cost of microseismic monitoring though the reduction of sensor array deployment costs and signal processing by increasing the signal-to-noise ratio of microseismic events.

One non-limiting aspect of the present invention is the ability to enable a user to understand how and where a proppant zone is actually located in the well by using proppant in combination with currently available microseismic monitoring. The sensing system of the present invention can be added to one or multiple zones and the frequency response given by the device can be uniform or tailored for each zone so the operator can determine how effective each fractured zone has been formed. This information leads both to the optimization of pumping proppant chemicals into a well and the well formation. The information can also be used to further increase the resolution of the fracture image created by microseismic sensing by adding levels of detail not currently achievable. Furthermore, the sensing system of the present invention can increase the signal-to-noise ratio by increasing the amount of microseismic noises in the ground, enabling either the production of a clearer picture of the fracture and/or enabling the same quality imaging with less sensing equipment and processing power that could significantly reduce microseismic monitoring costs.

The present invention includes a powerful acoustic emission production that enhances microseismic well monitoring techniques to the next level for well management and understanding. Such acoustic emission production allows for a clearer picture of the formation than was previously possible due to the enhancement of the signal-to-noise ratio and is tailored to be pumped into the fractures along with proppant, giving a visual map of proppant placement, concentration, and zone fracturing effectiveness. The invention can further enable optimizations in consumables and water use, lower cost, decreased waste streams, and a safer hydraulic fracturing process. The invention can aid the drilling and fracturing for geothermal wells by ensuring the best and most efficient communication path between the source and return geowell is achieved.

The invention is comprised of the engineered design and production of acoustic imaging agents in the form of protected particles, which protected particles include a base particle and an outer coating that partially or fully coats the outer surface of the base particle, or composite that includes a matrix material and a plurality of base particles in the matrix material. The base particle can include one or more hollow cavities; however, this is not required. The base particle is designed and configured to partially or fully fracture or collapse when exposed to certain external pressures, which fracturing or collapsing of the base particle results in the generation of an acoustic sound or signal. The outer coating or matrix material can be formed of one or more materials and/or one or more layers. In one non-limiting embodiment, the outer coating or matrix material is formed of one or more polymers and/or metals. The outer coating or matrix material is typically tailored for degradation or dissolution (collectively referred to as 'degradation') for the controlled delivery of the imploding acoustic signal caused or released from the fracturing or crushing of the base particle when exposed to certain subterranean pressures. The protected particles are configured to withstand initial subterranean well pressures; however, after a delayed period during which the outer coating partially or fully dissolves or degrades (collective referred to as 'degrades'), the protected particle weakens and the base particle is caused to facture or crush due to the pressures in the subterranean environment, thereby creating an acoustic sound or signal that can be detected. The use of the protected particles as localized acoustic emitting agents is expected to improve signal-to-noise ratios by at least a factor of two, thereby improving fracture imaging resolution.

One non-limiting object of the present invention is the provision of protected particles that can be added into a well or formation and be used to create a signal that is a readable and detectable acoustic signal or emission for use in microseismic well monitoring of the well or other type of formation.

Another and/or alternative non-limiting object of the present invention is the provision of a method for using protected particles that can be added into a well or formation and be used to create a signal that is a readable and detectable acoustic signal or emission for use in microseismic well monitoring of the well or other type of formation.

Another and/or alternative non-limiting object of the present invention is the provision of protected particles that are configured to at least partially crush or fracture to generate a readable and detectable acoustic signal or emission for use in microseismic well monitoring of the well or other type of formation.

Another and/or alternative non-limiting object of the present invention is the provision of protected particles that are configured to be controllably at least partially crushed or fractured to thereby cause a readable and detectable acoustic signal or emission.

Another and/or alternative non-limiting object of the present invention is the provision of protected particles that are formed of a base particle that can optionally include one or more hollow cavities, and which outer surface of the base particle is partially or fully coated with an outer coating or matrix material, which outer coating or matrix material is formulated and/or configured to inhibit or prevent the base particle from being crushed or fractured in a well or formation, and which outer coating or matrix material is configured to degrade to thereby allow the base particle to be fractured or crushed when exposed to certain pressures.

Another and/or alternative non-limiting object of the present invention is the provision of a method of inserting protected particles into a well or formation, which protected particles are inserted into regions of a well that would cause the base particle to be fractured or crushed but for the outer coating or matrix material about the base particle, and wherein the material of the outer coating or matrix material over time and/or under controlled conditions is caused to partially or fully degrade thereby resulting in the base particle being fractured or crushed, which fracturing or crushing results in the creation of a readable and detectable acoustic signal or emission, which acoustic signal or emission can be detected by a microseismic well monitoring system to be used to map fractures and/or other types of passages in a well or other type of formation.

Another and/or alternative non-limiting object of the present invention is the provision of protected particles that are formed of a base particle that is coated with an outer coating or matrix material that is formed of a polymer and/or metal.

Another and/or alternative non-limiting object of the present invention is the provision of protected particles that are formed of a base particle that is coated with an outer coating or matrix material, which outer coating or matrix material is a degradable or dissolvable (collectively referred to as degradable) polymer and/or metal.

Another and/or alternative non-limiting object of the present invention is the provision of protected particles that can be pumped with or without a proppant into a well.

Another and/or alternative non-limiting object of the present invention is the provision of protected particles that create an acoustic signal or emission at a certain frequency or a certain range of frequencies when the base particles are fractured or crushed due to a) the protected particles having a particular shape, b) the base particle having a particular shape, c) the one or more optional cavities in the base particle having a particular shape and/or configuration, d) pressure differential between the pressure in the one or more optional hollow cavities and the external pressure being exerted onto the base particle, e) material contained in the optional hollow cavity, and/or f) the material used to form the base particle, and wherein the created acoustic signal or emission by the fractured or crushed base particles is distinguishable and/or different from other sounds produced in the well or formation, so that the generated acoustic signals or emissions by the fractured or crushed base particles can be distinguished and detected by a microseismic well monitoring system from other sounds generated in the well or formation so that the generated acoustic signal or emissions by the fractured or crushed base particles can be used to map fractures and/or other types of passages in a well or other type of formation.

Another and/or alternative non-limiting object of the present invention is the provision of protected particles that have a particular outer coating or matrix material composition that is formulated to control when the outer coating or matrix material begins to degrade and/or the rate at which the outer coating or matrix material degrades. For instance, the outer coating or matrix material can be formulated to degrade when exposed to certain environments (e.g., saltwater, electrolyte solutions, water, air, electromagnetic waves, sound waves, temperature, pressure, etc.).

Another and/or alternative non-limiting object of the present invention is the provision of protected particles that have a particular outer coating or matrix material composition wherein the outer coating or matrix material can be formulated to be inert or substantially inert to the exposed environment until exposed to an activation condition such as, but not limited to, temperature, electromagnetic waves, sound waves, certain chemicals, pressure and/or pH.

Another and/or alternative non-limiting object of the present invention is the provision of protected particles wherein, once the outer coating or matrix material has been partially or fully removed or degraded, the base particle will fractured or crushed when exposed to high pressures and thereby emit an acoustic signal or emission.

Another and/or alternative non-limiting object of the present invention is the provision of the use of protected particles to facture or crush under hydrostatic pressure to create acoustic signals or emissions as a result of the fracturing or crushing of the base particle of the protected particles, which acoustic signals or emissions can be sensed by one or more subterranean sensors, such as, but not limited to, hydrophones, geophones, and fiber optics.

Another and/or alternative non-limiting object of the present invention is the provision of the use of protected particles that can be pumped and placed with hydraulic fracture proppant into a well or formation, and which protected particles can be used to provide accurate microseismic mapping of successful fractures and their propping.

Another and/or alternative non-limiting object of the present invention is the provision of the use of protected particles that include a base particle that has a crush strength lower than the desired formation being mapped, and the protected particles have a crush strength that is greater than the desired formation being mapped, so that when the outer coating or matrix material of the protected particles partially or fully degrades, the base particle will be fractured or crushed in the desired formation being mapped.

Another and/or alternative non-limiting object of the present invention is the provision of the use of protected particles that include a base particle that has a crush strength of 100-19,000 psi (and all values and ranges therebetween).

Another and/or alternative non-limiting object of the present invention is the provision of the use of protected particles that include a base particle that has a crush strength that is at least 1% less, and typically about 1-1000% less (and all values and ranges therebetween) than the pressure in the desired formation being mapped.

Another and/or alternative non-limiting object of the present invention is the provision of the use of protected particles that have a crush strength that is at least 1% greater, and typically about 1-1000% greater (and all values and ranges therebetween) than the pressure in the desired formation being mapped.

Another and/or alternative non-limiting object of the present invention is the provision of the use of protected particles that have a crush strength that is at least 2% greater, and typically about 2-500% greater (and all values and ranges therebetween) than the crush strength of the base particle of the protected particles.

Another and/or alternative non-limiting object of the present invention is the provision of the provision of the use of protected particles wherein the base particle is formed of glass, ceramic, or polymer.

Another and/or alternative non-limiting object of the present invention is the provision of the use of protected particles wherein the base particle, when fractured or crushed, emits a frequency in the range of 1-10,000 Hz (and all values and ranges therebetween).

Another and/or alternative non-limiting object of the present invention is the provision of using protected particles wherein the base particle has a diameter or size of 10 μm-100 mm (and all values and ranges therebetween).

Another and/or alternative non-limiting object of the present invention is the provision of the use of protected particles wherein the base particle has an interior pressure in the one or more optional hollow cavities of 10-19,000 psi (and all values and ranges therebetween).

Another and/or alternative non-limiting object of the present invention is the provision of the use of protected particles wherein the emitted frequency when the base particle fractures or crushes is controlled by the differential pressure between the one or more optional hollow cavities in the base particle and the pressure that is exterior to the base particle.

Another and/or alternative non-limiting object of the present invention is the provision of the use of protected particles wherein the outer coating or matrix material is formulated to degrade by hydrolysis, temperature-induced softening point, temperature-induced dissolution, or by other oxidation/reduction chemistries (such as the oxidative dissolution of dissolvable magnesium alloys).

Another and/or alternative non-limiting object of the present invention is the provision of the use of protected particles wherein the outer coating or matrix material is formulated from one or more polymers such as, but not limited to, polyvinylalcohols, polycarbohydrates, polycarbonate, polylactic acid, polyglycholic acid, polyamines, polyesters, and their mixtures or copolymers thereof.

Another and/or alternative non-limiting object of the present invention is the provision of the use of protected particles wherein the outer coating or matrix material is formulated to sufficiently partially or fully degrade within 1-72 hours (and all values and ranges therebetween) after being inserted into the well or formation such that the base particle is caused to fractured or crushed within 1-100 hours (and all values and ranges therebetween) after the protected particles have been inserted into the well or formation.

Another and/or alternative non-limiting object of the present invention is the provision of the use of protected particles wherein the volume of the protected particles is 0.1% to 10,000% (and all values and ranges therebetween) greater than the volume of the base particle without the outer coating.

Another and/or alternative non-limiting object of the present invention is the provision of the use of protected particles wherein the thickness of the outer coating is about 1 µm to 100 mm (and all values and ranges therebetween).

Another and/or alternative non-limiting object of the present invention is the provision of the use of protected particles wherein the outer coating or matrix material is applied to the base particle by one or more process such as, but not limited to, dipping, fluidized bed spray coating, chemical vapor deposition, suspension deposition, emulsion deposition, extrusion, tumbling and vibratory bed spray coating techniques.

Another and/or alternative non-limiting object of the present invention is the provision of the use of protected particles wherein the outer coating or matrix material can contain one or more additives to improve the crush resistance of the outer coating or matrix material, adjust the degradation time of the outer coating or matrix material, and/or adjust the density of the outer coating or matrix material.

Another and/or alternative non-limiting object of the present invention is the provision of the use of protected particles wherein the outer coating or matrix material can contain one or more additives such as, but not limited to, carbon nanotubes, carbon black, nanosilica, calcium, magnesium, iron, tungsten, calcium oxide, magnesium oxide, super absorbent polymers Another and/or alternative non-limiting object of the present invention is the provision of the use of protected particles wherein the outer coating or matrix material can contain one or more additives in the about of 0.01-50 wt. % (and all values and ranges therebetween).

Another and/or alternative non-limiting object of the present invention is the provision of the use of protected particles that can be pumped with proppant into a well or formation and wherein the volume percent ratio of protected particles to proppant being pumped into the well or formation is 0.001-1:1 (and all values and ranges therebetween).

Another and/or alternative non-limiting object of the present invention is the provision of the use of protected particles that have a different composition and/or configuration from the proppant.

Another and/or alternative non-limiting object of the present invention is the provision of an acoustic imaging agent that can be used for subterranean mapping of natural and induced fractures during hydraulic fracturing, wherein the acoustic imaging agent comprises a base particle and a degradable outer coating or matrix material, and optionally reinforcing, degrading, and/or dense particle additives.

Another and/or alternative non-limiting object of the present invention is the provision of an acoustic imaging agent wherein the base particle is the generating source for acoustic emission from its implosion under hydrostatic pressure, and the base particle's acoustic emission is dependent on its size, shape, shell material, shell thickness, hydrostatic crush strength, internal cavity pressure, and the external hydrostatic crush pressure.

Another and/or alternative non-limiting object of the present invention is the provision of an acoustic imaging agent wherein the base particle size ranges from about 10 µm and 100 mm (and all values and ranges therebetween), and typically 30 µm-5 mm.

Another and/or alternative non-limiting object of the present invention is the provision of an acoustic imaging agent wherein the base particle shape can be any three-dimensional shape that creates a hollow cavity such as, but not limited to spheroids, cubes, ovoids, irregular, or asymmetrical shapes.

Another and/or alternative non-limiting object of the present invention is the provision of an acoustic imaging agent wherein the base particle is comprised of one or more materials selected from the group consisting of glass (e.g., borosilicate, soda-lime silicate, phosphates, aluminosilicate, fused silica, lead-alkali, water soluble glass, and mixtures thereof); ceramic (e.g., aluminum oxide, silicon carbide, tungsten carbide, silicon nitride, titanium oxide, titanium carbide, barium titanate, boron nitrate, water soluble ceramics, and their mixtures thereof); or polymer (e.g., epoxies, phenolics, polyurethanes, polyamides, polyamines, polyaryls, polyethers, polyesters, polyvinyls, polyalkanes, polycarbonates, and their mixtures thereof).

Another and/or alternative non-limiting object of the present invention is the provision of an acoustic imaging agent wherein the thickness of the wall of the base particle is about 0.1 µm-200 mm (and all values and ranges therebetween), and typically 1-50 µm.

Another and/or alternative non-limiting object of the present invention is the provision of an acoustic imaging agent wherein the crush strength of the acoustic imaging agent is about 1,000-20,000 psi (and all values and ranges therebetween).

Another and/or alternative non-limiting object of the present invention is the provision of an acoustic imaging agent wherein the resistance to crush can be higher than the hydrostatic well stress pressures ranging from about 1,000-20,000 psi (and all values and ranges therebetween), but then becomes susceptible to the well stress hydrostatic crush as the outer coating or matrix material degrades.

Another and/or alternative non-limiting object of the present invention is the provision of an acoustic imaging agent wherein a frequency bandwidth of the acoustic signal or emission created by the fracturing or crushing of the base particle is about 0.4-10,000 Hz (and all values and ranges therebetween), and typically from about 0.-1,000 Hz at amplitude above 1 dB (e.g., $10^{-6}$).

Another and/or alternative non-limiting object of the present invention is the provision of an acoustic imaging agent wherein an internal cavity pressure in the base particle can be from about 10-19,000 psi (and all values and ranges therebetween) to change the differential pressure between the cavity interior of the base particle and the external hydrostatic well pressure, and the selection of the pressure in the cavity can be used to control the frequency of the acoustic signal or emission created by the fracturing or crushing of the base particle.

Another and/or alternative non-limiting object of the present invention is the provision of an acoustic imaging agent wherein a degradable outer coating or material reinforces the base particle against well hydrostatic pressures, and the outer coating or matrix material can be formulated to degrade after about 30 minutes to 700 hours (and all values and ranges therebetween).

Another and/or alternative non-limiting object of the present invention is the provision of an acoustic imaging agent wherein the degradation of the outer coating or matrix material is initiated by subterranean well conditions over a period of time during the well's stimulation operation, during, or after hydraulic fracture pumping.

Another and/or alternative non-limiting object of the present invention is the provision of an acoustic imaging agent wherein the outer coating or matrix material is formulated to degrade at well temperatures of about 30-200° C. (and all values and ranges therebetween).

Another and/or alternative non-limiting object of the present invention is the provision of an acoustic imaging agent wherein the outer coating or matrix material is caused to degrade in the chemical environment of the well, wherein the chemical environment can include brine solutions in the range of 0-500,000 ppm (and all values and ranges therebetween), alkaline or acidic pH in the range of 2-14, other chemical reactions involving oxidation or reduction, or combinations thereof.

Another and/or alternative non-limiting object of the present invention is the provision of an acoustic imaging agent wherein the period of time until the base particle fractures or crushes is about 1-72 hours (and all values and ranges therebetween), and typically from about 3-6 hours.

Another and/or alternative non-limiting object of the present invention is the provision of an acoustic imaging agent wherein the outer coating or matrix material is comprised of a polymer or metal, or a mixture thereof.

Another and/or alternative non-limiting object of the present invention is the provision of an acoustic imaging agent wherein the polymer that partially or fully forms the outer coating or matrix material is comprised of, but not limited to, polyvinylalcohols, polycarbohydrates, polycarbonates, polylactic acid, polyglycholic acid, poly(lactic-co-glycolic acid), polyamines, polyesters, and/or mixtures thereof; wherein the metal is comprised of, but not limited to, dissolvable metals like magnesium, calcium, and their alloys.

Another and/or alternative non-limiting object of the present invention is the provision of an acoustic imaging agent wherein crush strength of the acoustic imaging agent is 10-20,000% (and all values and ranges therebetween), and typically from about 50-1,000% greater than the crush strength of the base particle.

Another and/or alternative non-limiting object of the present invention is the provision of an acoustic imaging agent wherein the coating thickness of the outer coating is about 10 nm to 1,000 μm (and all values and ranges therebetween), and typically from about 10 nm to 100 um.

Another and/or alternative non-limiting object of the present invention is the provision of an acoustic imaging agent wherein the base particles in the matrix material constitute 0.01-60 vol. % of the acoustic imaging agent (and all values and ranges therebetween), and typically from about 10-40%.

Another and/or alternative non-limiting object of the present invention is the provision of an acoustic imaging agent wherein the outer coating is applied to the base particle by using spray, solution deposition, direct application, or other standard application methods, which includes, but is not limited to, fluidized bed spray coating, chemical vapor deposition, suspension deposition, emulsion deposition, tumbling and vibratory bed spray coatings.

Another and/or alternative non-limiting object of the present invention is the provision of an acoustic imaging agent wherein the acoustic imaging agent has a diameter or averaged width of about 10 μm-10 mm (and all values and ranges therebetween), and typically from about 35 μm-1 mm.

Another and/or alternative non-limiting object of the present invention is the provision of an acoustic imaging agent wherein the outer coating is applied to the base particle by melt mix, extrusion, spray aggregation, sintering, casting or other standard compounding methods.

Another and/or alternative non-limiting object of the present invention is the provision of an acoustic imaging agent wherein the dense particle additives are added to the outer coating or matrix material to adjust the agent's density to match the proppant that is pumped into the well fractures.

Another and/or alternative non-limiting object of the present invention is the provision of an acoustic imaging agent wherein the base particles have a density of 1.7-22.0 g/cc (and all values and ranges therebetween).

Another and/or alternative non-limiting object of the present invention is the provision of an acoustic imaging agent wherein the additives to the outer coating or matrix material can be powders of iron, tungsten, or mixtures thereof.

Another and/or alternative non-limiting object of the present invention is the provision of an acoustic imaging agent wherein the additives to the outer coating or matrix material are of a size in the range from about 10 nm-1 mm (and all values and ranges therebetween), and typically from about 100 nm-100 μm.

Another and/or alternative non-limiting object of the present invention is the provision of an acoustic imaging agent wherein the additives to the outer coating or matrix material increases the density of the acoustic imaging agent to about 0.5-5 g/cc (and all values and ranges therebetween), and typically from about 1-3 g/cc.

Another and/or alternative non-limiting object of the present invention is the provision of an acoustic imaging agent wherein the additives to the outer coating or matrix material constitute 0-10% volume (and all values and ranges therebetween) of the outer coating or matrix material and include, but are not limited to, carbon black, carbon nanotubes, silica, and calcium carbonate.

Another and/or alternative non-limiting object of the present invention is the provision of an acoustic imaging agent wherein the additives to the outer coating or matrix material constitute 0-30% volume (and all values and ranges therebetween) of the outer coating or matrix material and include, but are not limited to, magnesium oxide, calcium oxide, calcium, magnesium, and super absorbent polymers.

Another and/or alternative non-limiting object of the present invention is the provision of subterranean mapping of propped natural and induced fractures during or after hydraulic fracturing by acoustic imaging agent is done in conjunction with well monitoring sensing arrays.

Another and/or alternative non-limiting object of the present invention is the provision of an acoustic imaging agent that is mixed with proppant and then pumped into natural and induced fractures.

Another and/or alternative non-limiting object of the present invention is the provision of an acoustic imaging agent wherein the agent is mixed with the proppant at a volumetric loading ratio of agent to proppant in a range from about 0.01-10% (and all values and ranges therebetween), and typically from about 0.1-2.0%.

Another and/or alternative non-limiting object of the present invention is the provision of an acoustic imaging agent wherein the agent emits its signal after the delayed time span to be sensed and recorded by the well's sensor arrays.

Another and/or alternative non-limiting object of the present invention is the provision of an acoustic imaging agent wherein the recorded signal by the well's sensor arrays provides well fracture information that includes proppant placement (three-dimensional map of the maintained fracture network) and at a higher resolution, then compared to mapping active fracture formations due to the agent's generation of microseismic signal increasing the sensor array's recorded signal-to-noise ratio.

These and other advantages of the present invention will become more apparent to those skilled in the art from a review of the description of the preferred embodiment and claims.

DETAILED DESCRIPTION OF NON-LIMITING EMBODIMENTS

Figures 1, 2:
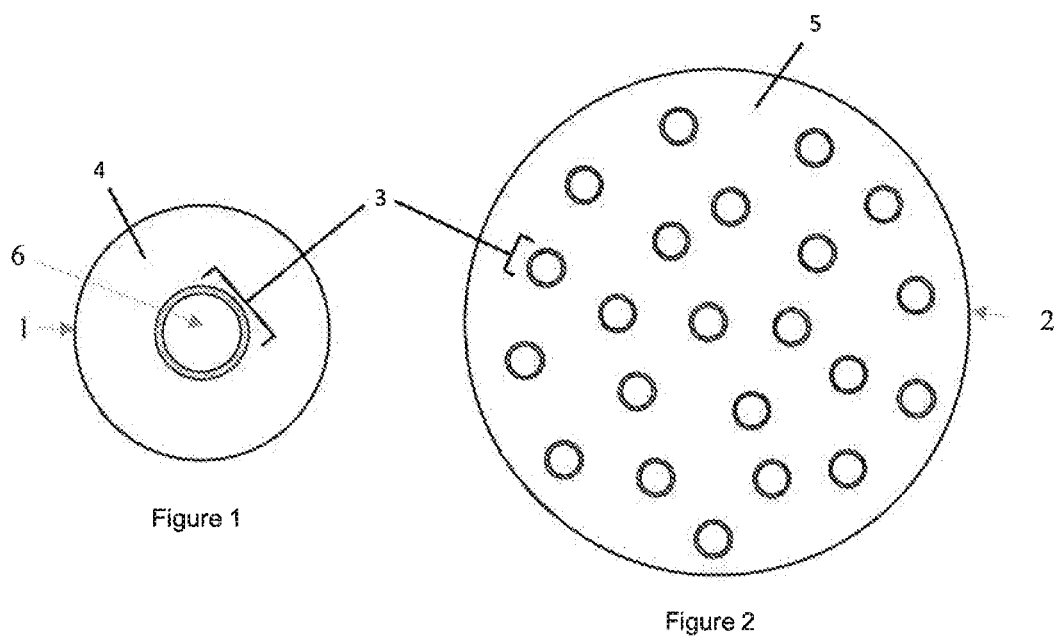
FIG. 1 illustrates a coated hollow particle sphere acoustic imaging agent in accordance with the invention; and, FIG. 2 illustrates a compounded hollow particle sphere acoustic imaging agent in accordance with the invention.

The present invention relates to an imaging agent for microseismic monitoring of subterranean formations such as those generated during hydraulic fracturing. The invention also pertains to an imaging agent, a method of producing the imaging agent, and the use of the imaging agent in a well or formation. The invention as described herein is particularly applicable to the use of an imaging agent for subterranean formation monitoring of energy production wells such as oil, gas, and geothermal; however, it will be appreciated that the invention is also intended for use in other seismic monitoring applications in which is it desirable to know flow passage in a well or other type of subterranean formation.

The present invention utilizes the implosion energy of a base particle in a protected particle as the base particle fractures or collapses under hydrostatic pressure for microseismic monitoring of subterranean formations. The fracturing or collapsing of the base particle generates an acoustic sound or emission that can be sensed by one or more sensors (e.g., subterranean sensors, etc.) such as hydrophones, geophones, and fiber optic sensors.

The protected particle is configured to be a pumpable microseismic emitting agent that can be pumped and placed with hydraulic fracture proppant in a well or formation, and which protected particle can be used to provide accurate microseismic mapping of the well or formation during and/or after the fracturing and/or propping of the well or formation. Two non-limiting examples of protected particles in accordance with the present invention are illustrated in FIGS. 1 and 2.

Referring now to FIG. 1, there is illustrated protected particle 1 that is formed of a base particle 3 and an outer coating 4 that is coated on the outer surface of base particle 3. Base particle 3 includes a hollow cavity 6. The thickness of the outer coating is illustrated as being greater than the thickness of the shell of the base particle; however, this is not required. As can be appreciated, the base particle can be absent hollow cavity 6. As can also be appreciated, the base particle can optionally include more than one cavity. The hollow cavity can be filled with one or more gasses; however, this is not required. The pressure inside the hollow cavity can be controlled; however, this is not required. In one non-limiting arrangement, the pressure in the hollow cavity can be 0-20000 psi (and all values and ranges therebetween). In one particular configuration, the pressure in the hollow cavity is about 0-1000 psi, and typically about 0-100 psi, and more typically about 10-20 psi (e.g., 14.7 psi). When a gas is included in the hollow cavity, the type of gas is non-limiting (e.g., air, nitrogen, oxygen, etc.). The base particle can be formed of a variety of materials such as, but not limited to, glass, ceramic, or polymer. In one non-limiting configuration, the base particle is a hollow sphere formed of a glass material such as, but not limited to, borosilicate or soda-lime silicate spheres. In another non-limiting configuration, the base particle is formed of degradable sodium silicate which may or may not include a hollow cavity. The size or diameter of the base particle is generally about 10 µm-100 mm (and all values and ranges therebetween), and typically from about 30 µm-1 mm. In one non-limiting configuration, the size or diameter of the base particle is about 30-990 µm and the shape of the base particle is generally spherical. The crush strength of the base particle is generally 100-19000 psi (and all values and ranges therebetween).

The outer coating is generally formed of a material that is formulated to degrade by one or more mechanisms such as, but not limited to, hydrolysis, temperature softening, dissolution, and/or an oxidation/reduction reaction (such as the oxidative dissolution of dissolvable magnesium alloys, dissolvable aluminum alloys, calcium, magnesium, dissolvable magnesium-nickel alloys, or other dissolvable metals or dissolvable metal alloys). Non-limiting examples of dissolvable metal materials that can be used are disclosed in U.S. Pat. No. 9,757,796 and US 2015/0299838, which are incorporated herein by reference. In one non-limiting configuration, the outer coating includes one or more polymers susceptible to hydrolysis, temperature-induced softening and/or temperature-induced dissolution. Non-limiting examples of polymers that can partially or fully form the outer coating include, but are not limited, to polyvinylalcohols, polycarbohydrates, polycarbonate, polylactic acid, polyglycholic acid, polyamines, polyesters, polyether, polyamine, polyacetal, polyvinyl, polyurethane, epoxy, polysiloxane, polycarbosilane, polysilane, and polysulfone and their mixtures or copolymers thereof. The thickness of the outer coating generally is 2 µm-100 mm (and all values and ranges therebetween), and typically 2 µm-60 mm. The outer coating can be applied to the base particle by any number of techniques such as, but not limited to, dipping, fluidized bed spray coating, chemical vapor deposition, suspension deposition, emulsion deposition, tumbling and vibratory bed spray coatings.

Referring now to FIG. 2, there is illustrated a protected particle 2 that is formed of a plurality of base particles 3 that are held together by a matrix material 5. Matrix material 5 can be formed of the same material as outer coating 4 as discussed with reference to FIG. 1. Likewise the base particle 3 can be the same as the base particle as discussed with reference to FIG. 1. The volumetric ratio of the base particle to the matrix material in the protected particle 0.01-100:1 (and all values and ranges therebetween), and typically 0.01-0.5:1.

The size of the protected particles is generally greater than 10 µm and typically less than about 200 mm (and all values and ranges therebetween).

The protected particle is configured to survive its delivery to the desired location in the well or formation. The use of the outer coating or matrix material increases the resistance of the base particle to fracturing or crushing by the formation's hydrostatic pressure. The outer coating or matrix material is formulated to degrade over time in the well or formation, thereby resulting in the eventual fracturing or crushing of the base particle. As such, the outer coating or matrix material is formulated to delay the fracturing or crushing of the base particle until the protected particle has been placed within the well or formation. Generally, the protected particle is fed into the well or formation with a proppant; however, this is not required. The fracturing or crushing of the base particle results in the creations of an acoustic signal or emission that can be detected for use in mapping the well or formation.

The base particles that are used in the protected particle are designed to have a crush strength that is less than the desired formation to be mapped. For example, if a location in a well to be mapped has a pressure of 6,000 psi, a base particle should be selected to have a crush strength of less than 6000 psi (e.g., base particle having a crush strength of 4,000 psi or less, etc.). Generally, the crush strength of the base particle is at least 100 psi less than the pressure in the well or formation to be mapped, typically at least 500 psi less than the pressure in the well or formation to be mapped, and more typically at least 750 psi less than the pressure in the well or formation to be mapped. If the crush strength of the base particle to too close to or greater than the pressure in the well or formation to be mapped, the base particle may not or will not fracture or crush, this not create the acoustic signal or emission to be used to map the well or formation.

It has been found that the frequency of the generated acoustic sound or emission caused by the fracturing or crushing of the base particle is dependent on the size of the base particle and the difference in pressure between the hollow base particle's interior pressure and the formation pressure. Generally, the frequency of the generated acoustic sound or emission caused by the fracturing or crushing of the base particle is in the range of 1-10,000 Hz (and all values and ranges therebetween), and more typically from about 1-1,000 Hz. To generate such frequencies, 1) the size of the base particle is generally about 10 µm to 100 mm (and all values and ranges therebetween) in size or diameter, and typically about 30 µm to 1 mm in size or diameter, and 2) the interior pressure in the hollow cavity of the base particle is about 10 psi to 19,000 psi (and all values and ranges therebetween). Controlling the microseismic emission or signal frequency by internal pressure modification in the base particle changes the differential pressure between the hollow cavity in the base particle and the exterior well pressure; thus, the frequency of the emission or signal caused by the fracturing or crushing of the base particle can be tailored. The following equation can be used to calculate the frequency of the emission or signal caused by the fracturing or crushing of the base particle in the well or formation.

$$\omega_o = \frac{1}{R_o}\sqrt{\frac{3\gamma p_o}{\rho}} \qquad \text{Equation 1}$$

Where $\omega_o$ is the resonant frequency $\rho$ is the density of the liquid $R_o$ is the average size of the resonating balloon and $P_o$ is the average pressure By using the ideal gas law $P_1V_1=P_2V_2 R_o$ can be found by $$R_o = \sqrt[3]{\frac{P_g R_i^3}{P_l}} \qquad \text{Equation 2}$$

Where $P_g$ is the pressure inside the balloon and $P_1$ is the pressure of the surrounding fluid at burst.

From these two equations, a trend for resonant frequency vs. size and pressure can be obtained.

The protected particle includes a degradable outer coating or matrix material to increase the resistance of the base particle to being fractured or crushed by the formation pressure until the protected particle has been delivered to a desired location in the well or formation. The outer coating or matrix material is thus formulated to provide temporarily protection to the base particle so that it may be delivered to the formation fractures with the proppant. The outer coating or matrix material is formulated to degrade and thus fracture or crush the base particles, creating an acoustic signal or emission that can be detected and used to map the well or formation.

Common subterranean well formation conditions can range in load stress pressures of 2,000-20,000 psi, temperatures ranging from about 30-200° C., and include ionic solutions at pH from about 2-12 (the pH typically due to fracturing fluids). Therefore, the outer coating or matrix material can be selected and coating thickness selected to 1) provide crush and/or fracture protection to the base particle as the protected particle is inserted into the formation so that the base particle is not fractured or crushed prior to the protected particle being pumped, inserted or otherwise positioned in the desired location in the formation, and 2) sufficiently degrade during a certain period of time to fracture or crush the base particles and emit an acoustic signal or emission. The use of the outer coating or matrix material enables the protected particle to be pumped into a formation and placed in a desired location in the formation without premature signal emission (e.g., the base particle is not prematurely fractured or crushed prior to being pumped or otherwise placed in the desired location in the formation), and the outer coating or matrix material have a short enough degradation duration (e.g., less than 420 hours, etc.) to fracture or crush the base particle and to create an acoustic signal or emission that can be detected during the monitoring of the formation in a time efficient period.

The degrading of the outer coating or matrix material can be by hydrolysis, temperature softening point/dissolution, or by other oxidation/reduction chemistries (e.g., oxidative dissolution of dissolvable magnesium alloys, etc.). As such, the selection of the material used for the outer coating or matrix material is dependent on the formation's conditions and needs to match the temperature and chemical interaction for degradation to take place in a timely manner. For example, in a typical subterranean well formation, the conditions encountered can be 90° C. with formation load stress pressure at 8,000 psi, and the pumping solution in the formation can be 2 wt. % KCl at a pH of 7. For such subterranean well formation conditions, one polymer for the outer coating or matrix material can be poly(lactic-co-glycolic acid) (PLGA), a co-polyester susceptible to degradation by hydrolysis at temperatures of 80-90° C. over a period of 12-24 hours. In more extreme subterranean well formation conditions (e.g., higher temperatures and pressures), other polymers can be used, such as polyamides or polyaryls which will degrade over a period of 6-24 hours.

The thickness of the outer coating or thickness of the matrix material about the base particle, in combination with the type of material of the outer coating or matrix material, is selected to provide the desired fracture or crush protection to the base particle for a sufficient period of time to enable the protected particle to be inserted, pumped or other positioned in the desired location in the formation. The coating thickness of the outer coating or composite ratio of the matrix material to the base particles is dependent on 1) the type of material used for the outer coating or matrix material, 2) the material used to form the base particle, 3) the thickness of the shell of the base particle when the base particle includes one or more cavities, 4) the size of the base particle, 5) the crush strength of the base particle, 6) the formation pressure where the protected particle is to be located, 7) the temperature in the formation in which the protected particle is to be located, and 8) the composition and pH of the fluid in the formation in which the protected particle is to be located. Generally, the volumetric increase from the base particle to the protected particle due to the addition of the outer coating to the base particle is about 0.01-10,000% (and all values and ranges therebetween). For example, in one non-limiting embodiment of the present invention, a 40 μm hollow sphere particle having an inherent crush strength of 4,000 psi includes a polymer outer coating of 60 μm to that the protected particle can be exposed to pressures of 8,000 psi without resulting in the fracturing or crushing of the base particle. In this non-limiting embodiment, the volumetric increase from the base particle to the protected particle due to the coating of the polymer material on the outer surface of the base particle is about 1563%.

The outer coating or matrix material can optionally include additives for the purpose of further improving the crush resistance of the protected particle, controlling degradation time of the outer coating or matrix material, and/or adjusting the density of the protected particle so that it can be properly pumped into a formation. The size of the additives are generally less than 100 μm, and typically less than 1 μm. Non-limiting additives for improving crush resistance include, but are not limited to, carbon nanotubes, carbon black, and nanosilica. Such additives (when used) constitute about 0.001-10 vol. % of the outer coating or matrix material (and all values and ranges therebetween). When such reinforcing or crush strength enhancement additives are used, such use of the additives increases the crush strength of the protected particle by 5-20,000% (and all values ad ranges therebetween), and typically about 10-5000%, and more typically about 10%-1000%. Non-limiting additives for controlling degradation time of the outer coating or matrix material include, but are not limited to, calcium, magnesium, calcium oxide, magnesium oxide, and super absorbent polymers or mixtures thereof. The size of the additives is generally less than 1000 μm, and typically less than 100 μm. Such additives (when used) constitute about 0.001-30 vol. % of the outer coating or matrix material (and all values and ranges therebetween). When such additives to control degradation time are used, such use of the additives typically reduces the time of degradation of the outer coating or matrix material by 5-5000%, and typically by 10-500%, and more typically by 10-100%. Non-limiting additives for adjusting the density of the outer coating or matrix material are materials having a density of at least 1.7 g/cc, typically at least 5 g/cc, and more typically at least 6.5 g/cc. Non-limiting examples of additives that can be used to adjust density include, but are not limited to, nano- and micro-powders of one or more high density metals (e.g., iron, copper, lead, steel, tungsten, etc.). Such additives (when used) constitute about 0.001-10 vol. % of the outer coating or matrix material (and all values and ranges therebetween). The size of the additives are generally less than 100 μm, and typically less than 1 μm. When such additives to adjust density are used, such use of the additives typically increase the density of the protected particle by 5-1000%, and typically by 5-100%, and more typically by 5-50%.

When the protected particle is to be pumped into a formation with a proppant, the size of the protected particle to the proppant is generally similar. In one non-limiting embodiment, the size ratio of the protected particle to the proppant is generally about 0.8-1.4:1, and typically about 0.9-1.1:1. Also, the density of the protected particle to the proppant is similar when the protected particle is to be pumped into a formation with a proppant. In one non-limiting embodiment, the density ratio of the protected particle to the proppant is generally about 0.8-1.4:1, and typically about 0.9-1.1:1. As such, the size and density of the protected particle can be selected to match or closely match proppant density and size so that the protected particle can replicate the pumping and placement performance of the proppant so as to match placement of the proppant within the fractures of the formation. When the protected particle is to be pumped into a formation with a proppant, the protected particle is generally added to the proppant slurry such that there is more proppant in the slurry than protected particles. In one non-limiting embodiment, the volume ratio of the protected particle to the proppant in the slurry that is pumped or otherwise inserted into the formation is about 0.00001-0.1:1 (and all values and ranges therebetween), and typically 0.0001-0.05:1, and more typically 0.0001-0.01:1.

The following are non-limiting specific examples of protected particles in accordance with the present invention:

EXAMPLE 1

A protected particle was formed of a base particle having an average diameter of 30 μm. The base particle is a hollow sphere having a shell thickness of 1 μm. The interior pressure in the hollow cavity of the base particle is 14.7 psi. The density of the base particle is 0.38 g/cc and the crush strength of the base particle is 2,000 psi. The outer surface of the base particle was coated with a hydrolysable polyamine by spray coating deposition. Two different batches of protected particles were formed wherein the first batch had an outer coating thickness of 10 nm and the second batch has an outer coating thickness of 100 nm. The crush strength of both batches of protected particles exceeded 2,000 psi. The two batches of protected particles were inserted into a well formation and the fracturing or crushing of the base particle resulted in the creation of an acoustic sound or emission at a frequency of 100-20,000 Hz, and the timing of the creation of the acoustic sound or emission from the two batches of protected particles was different due to the different coating thicknesses on the two batches of protected particles. The protected particles having an outer coating thickness of 10 nm resulted in the creation of the acoustic sound or emission about 10 hours after the protected particles were pumped into the well formation. The protected particles having an outer coating thickness of 100 nm resulted in the creation of the acoustic sound or emission about 400 hours after the protected particles were pumped into the well formation.

EXAMPLE 2

A protected particle was formed of a base particle having an average diameter of 100 μm. The base particle is a hollow sphere having a shell thickness of 3 μm. The interior pressure in the hollow cavity of the base particle is 14.7 psi. The density of the base particle is 0.24 g/cc and the crush strength of the base particle is 1,500 psi. The outer surface of the base particle was coated with a polyvinylalcohol coating that includes 5 wt. % fumed silica nanoparticles. The fumed silica nanoparticles were added to increase the crush strength of the protected particle. The outer coating thickness was 60 nm. The resulting protected particle has a crush strength of over 6,000 psi. The protected particle was configured to be pumpable into a formation with a proppant.

EXAMPLE 3

A protected particle was formed of a base particle having an average diameter of 100 μm. The base particle is a hollow sphere having a shell thickness of 3 μm. The interior pressure in the hollow cavity of the base particle is 14.7 psi. The density of the base particle is 0.24 g/cc and the crush strength of the base particle is 1,500 psi. The outer surface of the base particle was coated with a polyvinylalcohol coating. The outer coating thickness was 60 nm. The resulting protected particle has a crush strength of about 4,000 psi. The protected particle was configured to be pumpable into a formation with a proppant. As is evident from Examples 2 and 3, the addition of additives to the outer coating can be used to change the crush strength of the protected particle.

EXAMPLE 4

A protected particle was formed of a base particle having an average diameter of 100 μm. The base particle is a hollow sphere having a shell thickness of 3 μm. The interior pressure in the hollow cavity of the base particle is 14.7 psi. The density of the base particle is 0.24 g/cc and the crush strength of the base particle is 1,500 psi. The outer surface of the base particle was coated with a poly(lactic-co-glycolic acid) (PLGA) that included 5 wt. % CaO. The CaO was added to the outer coating to increase the rate of degradation of the outer coating in the well formation. The resulting protected particle has a crush strength of over 6,000 psi. The protected particle was configured to be pumpable into a formation with a proppant. The protected particles in the well formation began to create acoustic sounds or emissions due to the fracturing or crushing of the base particle about 7 hours after the protected particles were pumped into the well formation and the creation of the acoustic sounds or emissions continued for up to 2 hours thereafter.

EXAMPLE 5

A protected particle was formed of a base particle having an average diameter of 100 μm. The base particle is a hollow sphere having a shell thickness of 3 μm. The interior pressure in the hollow cavity of the base particle is 14.7 psi. The density of the base particle is 0.24 g/cc and the crush strength of the base particle is 1,500 psi. The outer surface of the base particle was coated with a poly(lactic-co-glycolic acid) (PLGA). The resulting protected particle has a crush strength of over 6,000 psi. The protected particle was configured to be pumpable into a formation with a proppant. The protected particles in the well formation began to create acoustic sounds or emissions due to the fracturing or crushing of the base particle about 12 hours after the protected particles were pumped into the well formation and the creation of the acoustic sounds or emissions continued for up to 6 hours thereafter. As is evident from Examples 4 and 5, the addition of additives to the outer coating can be used to change the degradation time of the outer coating of the protected particle.

EXAMPLE 6

A protected particle was formed of a plurality of base particles having an average diameter of 100 μm. The base particle is a hollow sphere having a shell thickness of 1.4 μm. The interior pressure in the hollow cavity of the base particle is 14.7 psi. The density of the base particle is 0.1 g/cc. The plurality of base particles was mixed with a matrix material formed of poly(lactic-co-glycolic acid) (PLGA) and 10 wt. % micron tungsten powder. The micron tungsten powder was added to the PLGA to increase the density of the protected particle. The micron tungsten powder was formed from a filament of tungsten having a 1 mm diameter. The filament was chopped into the desired size. The base particles constituted 30 vol. % of the protected particle. The protected particle was formed through melt mixing extrusion of the base particles with the matrix material. The protected particle had a density of about 2.8 g/cc.

The protected particles were added to a proppant slurry and constituted about 0.1 wt. % of the proppant slurry. The proppant slurry with the protected particles was pumped into the fracturing zones of a well. The matrix material of the protected particles degraded by hydrolysis and the rate of degradation only increased to an appreciable rate once the protected particles encountered the higher temperatures within the deep well's fractures (around 60-100° C.) at pH of 6-8. In the higher temperature environment (60-100° C.) and exposed to fluids at a pH of 6-8, the matrix material degraded within 24 hours thereby releasing the base particles from the protected particle, thus resulting in the fracturing and crushing of the base particles. The fracturing or crushing of the base particles resulted in acoustic sounds or emissions being created at a certain frequency which were detected by sensor arrays. The recorded signals from the cumulative sensor arrays were then interpreted with modeling software to identify source locations of the signals, and such information was then used to mapping out proppant placement in the well, and to determine where successful fracturing had occurred in the well.

EXAMPLE 7

A protected particle was formed of a base particle having an average diameter of 40 μm. The base particle is a hollow sphere having a shell thickness of 1 μm. The interior pressure in the hollow cavity of the base particle is 14.7 psi. The density of the base particle is 0.38 g/cc and the crush strength of the base particle is 1,500 psi. The outer surface of the base particle was coated with a PLGA by suspension deposition. The coating thickness was 60 μm. The protected particle had a crush strength of about 8000 psi. The protected particles were subjected to well conditions of 30,000 ppm brine solution at a pH of 7.5, a temperature of 90° C., and under 6,000 psi hydrostatic pressure. After about 12 hours and over the period of 2 hours thereafter, the base particles were fractured or crushed. The acoustic sound or emission created by the fractured or crushed base particles had a traceable harmonic resonant frequency peak at 1,500 Hz.

EXAMPLE 8

A protected particle was formed of a base particle having an average diameter of 20 μm. The base particle is a hollow sphere having a shell thickness of 1 μm. The interior pressure in the hollow cavity of the base particle is 14.7 psi. The density of the base particle is 0.38 g/cc and the crush strength of the base particle is 1,500 psi. The outer surface of the base particle was coated with a PLGA by suspension deposition. The coating thickness was 18 μm. The protected particle had a crush strength of about 8000 psi. The protected particles were subjected to well conditions of 30,000 ppm brine solution at a pH of 7.5, a temperature of 90° C., and under 6,000 psi hydrostatic pressure. After about 12 hours and over the period of 2 hours thereafter, the base particles were fractured or crushed. The acoustic sound or emission created by the fractured or crushed base particles had a traceable harmonic resonant frequency peak at 3,000 Hz. As is evident from Examples 7 and 8, the protected particle can be tailored by using different sized base particles to create a certain frequency or range of frequencies when the base particle fractures or crushes.

EXAMPLE 9

A protected particle was formed of a base particle having an average diameter of 40 μm. The base particle is a hollow sphere having a shell thickness of 1 μm. The interior pressure in the hollow cavity of the base particle is 14.7 psi. The density of the base particle is 0.38 g/cc. The outer surface of the base particle was coated with a PVA by suspension deposition. The coating thickness was 68 μm. The protected particle had a crush strength of about 8000 psi. The protected particles were subjected to well conditions of 10,000 ppm brine solution at a pH of 8, a temperature of 80° C., and under 6,000 psi hydrostatic pressure. After about 36 hours and over the period of 72 hours thereafter, the base particles were fractured or crushed. The acoustic sound or emission created by the fractured or crushed base particles had a traceable harmonic resonant frequency peak at 1,500 Hz.

EXAMPLE 10

A protected particle was formed of a base particle having an average diameter of 40 μm. The base particle is a hollow sphere having a shell thickness of 1 μm. The interior pressure in the hollow cavity of the base particle is 1000 psi. The density of the base particle is 0.39 g/cc. The outer surface of the base particle was coated with a PVA by suspension deposition. The coating thickness was 68 μm. The protected particle had a crush strength of about 8000 psi. The protected particles were subjected to well conditions of 10,000 ppm brine solution at a pH of 8, a temperature of 80° C., and under 6,000 psi hydrostatic pressure. After about 36 hours and over the period of 72 hours thereafter, the base particles were fractured or crushed. The acoustic sound or emission created by the fractured or crushed base particles had a traceable harmonic resonant frequency peak at 600 Hz. As is evident from Examples 9 and 10, the protected particle can be tailored by using certain pressures in the hollow cavity of the base particle to create a certain frequency or range of frequencies when the base particle fractures or crushes.

EXAMPLE 11

A protected particle was formed of a base particle having an average diameter of 40 μm. The base particle is a hollow sphere having a shell thickness of 1 μm. The interior pressure in the hollow cavity of the base particle is 14.7 psi. The density of the base particle is 0.38 g/cc. The outer surface of the base particle was coated with a PVA that included additive of nano-carbonyl iron to adjust the density of the protected particle to 1.9 g/cc. The coating was applied to the base particle by suspension deposition. The coating thickness was 60 μm. The protected particle had a crush strength of about 8000 psi. The protected particles were subjected to well conditions to fracture or crush the base particles. The acoustic sound or emission created by the fractured or crushed base particles had a traceable harmonic resonant frequency peak at 1,500 Hz.

EXAMPLE 12

A protected particle was formed of a base particle having an average diameter of 20 μm. The base particle is a hollow sphere having a shell thickness of 1 μm. The interior pressure in the hollow cavity of the base particle is 1000 psi. The density of the base particle is 0.38 g/cc. The outer surface of the base particle was coated with a PVA that included additive of nano-carbonyl iron to adjust the density of the protected particle to 2.9 g/cc. The coating was applied to the base particle by suspension deposition. The coating thickness was 60 μm. The protected particle had a crush strength of about 8000 psi. The protected particles were subjected to well conditions to fracture or crush the base particles. The acoustic sound or emission created by the fractured or crushed base particles had a traceable harmonic resonant frequency peak at 1,200 Hz. As is evident from Examples 11 and 12, the protected particle can be tailored by using certain pressures in the hollow cavity of the base particle and sizes of the base particles to create a certain frequency or range of frequencies when the base particle fractures or crushes. When two or more different types of protected particles that have been tailored to generate different frequencies or ranges of frequencies when the base particles of the two or more different protected particles are fractured or crushed, the recorded multiple frequency profile signals at the sensor arrays can be used to provide two or more separate maps of the fractures and formations in a well. Such information can be used to provide increased accuracy to the mapping of formations.

EXAMPLE 13

A protected particle was formed of a base particle having an average diameter of 200 μm. The base particle is a hollow sphere having a shell thickness of 48 μm. The base particle was formed of degradable sodium silicate. The interior pressure in the hollow cavity of the base particle is 14.7 psi. The density of the base particle is 2.06 g/cc. The outer surface of the base particle was coated with a polylactic acid (PLA) by fluid bed spray coating. The coating thickness was 0.5 µm. The protected particle had a crush strength of over 12,000 psi. The protected particles were added to a proppant slurry and constituted about 0.5 wt. % of the proppant slurry. The proppant slurry with the protected particles was pumped into the fracturing zones of a well. The outer coating of PLA degraded by hydrolysis in the well and the rate of degradation only increased to an appreciable rate once the PLA encounters the higher temperatures within the deep well's fractures (around 60-100° C.), and thereafter degraded within 24 hours which exposed the readily degradable sodium silicate hollow spheres to the well pressure, thus being hydrostatically crushed.

EXAMPLE 14

A protected particle was mixed with a fracturing proppant such that the protected particles constituted about 1 wt. % of the proppant slurry. The proppant slurry was then pumped into the fracturing zones in a well. The use of the protected particles increased the recordable signal from hydraulic fracture formation to a signal-to-noise ratio of 1.05. The subterranean noise was approximately 30 dB and the base recorded fracture noise was about 32 dB. The protected particle, after its controlled delay for signaling due to the fracturing or crushing of the base particles, increased the recorded fracture formation microseismic noise to a signal-to-noise ratio of 2.0, with peak frequencies recorded up to 60 dB. Such increases in signal-to-noise ratio were used to improve the accuracy in the mapping of the formations in the well.

The protected particles in Examples 1-14 can be used to map well formations or other types of formations by the pumping, insertion or placement of the protected particle in the formation and then monitoring the created signal or emission from the fractured or crushed base particle after the protected particle is located in the desired location in the formation. As can be appreciated, the protected particles in accordance of the present invention can have other uses. For example, the protected particle can be used to monitor subterranean pressures through the well and across different regions in the well as illustrated in Example 15.

EXAMPLE 15

A protected particle was formed of a base particle having an average diameter of 500 µm. The base particle is a hollow sphere having a shell thickness of 10 µm. The interior pressure in the hollow cavity of the base particle is 14.7 psi. The outer surface of the base particle was coated with a polyester by chemical vapor deposition. The coating thickness was 120 µm. The protected particle had a crush strength of about 7000 psi. The protected particles were subjected to well conditions to fracture or crush the base particles. The acoustic sound or emission created by the fractured or crushed base particles had a traceable harmonic resonant frequency peak at 550 Hz. The polyester coating was used because of its slow degradation rate in well formation. For this application of the protected particles, the base particle in the protected particles was to be fractured or crushed when the protected particle encountered a pressure in the formation that was greater than the crush strength of the protected particle (e.g., the crush strength of the protected particle prior to any significant degradation of the outer coating). In use, when the protected particle is pumped into the subterranean fractures of the well, the protected particle will eventually encounter a well pressure that is greater than the crush strength of the protected particle, thereby resulting in the base particle being fractured or crushed, thereby creating an acoustic signal or emission that can be detected. By using this technique, protected particles having known crush strengths can be used to map the pressures in a well formation by monitoring such certain protected particles creating an acoustic signal or emission that can be detected. As illustrated in Example 16, the frequency of the protected particle can be tailored to distinguish protected particles having different crush strengths.

EXAMPLE 16

A protected particle was formed of a base particle having an average diameter of 500 µm. The base particle is a hollow sphere having a shell thickness of 10 µm. The interior pressure in the hollow cavity of the base particle is 14.7 psi. The outer surface of the base particle was coated with a polyester by chemical vapor deposition. The coating thickness was 100 µm. The protected particle had a crush strength of about 6000 psi. The protected particles were subjected to well conditions to fracture or crush the base particles. The acoustic sound or emission created by the fractured or crushed base particles had a traceable harmonic resonant frequency peak at 500 Hz. The polyester coating was used because of its slow degradation rate in well formation. For this application of the protected particles, the base particle in the protected particles was to be fractured or crushed when the protected particle encountered a pressure in the formation that was greater than the crush strength of the protected particle (e.g., the crush strength of the protected particle prior to any significant degradation of the outer coating). In use, when the protected particle is pumped into the subterranean fractures of the well, the protected particle will eventually encounter a well pressure that is greater than the crush strength of the protected particle, thereby resulting in the base particle in the protected particle being fractured or crushed, thereby creating an acoustic signal or emission that can be detected. By using this technique, protected particles having known crush strengths can be used to map the pressures in a well formation by monitoring such certain protected particles creating an acoustic signal or emission that can be detected. As can be appreciated, different types of protected particles can be used to map different pressures in a well formation. For example, the protected particles in Example 15 can be used to map when the pressure in certain locations or regions of the well formation are about 7000 psi, and the protected particles in Example 16 can be used to map when the pressures at certain locations or regions in the well formation are about 6000 psi. The different frequencies created by these two protected particles when the base particle is fractured or crushed can be used to identify which of the protected particles are fracturing or crushing in the well formation and the location in the well of such protected particles.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed is:

1. A method of mapping subterranean formations comprising:
   a. providing an acoustic imaging material, said acoustic imaging agent material including a plurality of acoustic imaging particles; each of said acoustic imaging particles includes a base particle mixed with a matrix material; each of said acoustic imaging particles has a crush strength and is configured to be fractured or crushed when pressure about said base particle exceeds said crush strength of said base particle to produce a detectable acoustic signal or emission which can be used to provide information about a subterranean formation; said crash strength of said base particle is 10-20,000% less than a crush strength of said acoustic imaging particle; said base particle is a hollow sphere; said hollow sphere includes one or more materials selected from the group consisting of water glass, glass and ceramic; said hollow sphere has a diameter of 10 μm to 1 mm; said hollow sphere has a wall thickness of 0.1 μm to 200 mm; said hollow sphere has a crush strength of 100-19000 psi; said matrix material is formed of over 50 wt. % of one or more materials selected from the group consisting of polymer and metal; each of said base particle is configured to produce an acoustic signal or emission of about 0.4 Hz to below 10,000 Hz; a diameter of said acoustic imaging agent is up to 10 mm;
   b. inserting said acoustic imaging material into said subterranean formation;
   c. causing one or more of said acoustic imaging particles to be fractured or crushed due to a pressure about each of said acoustic imaging particles exceeding a crush strength of said acoustic imaging particles as said acoustic imaging particles flowing through said subterranean formation; and whereby said fracturing or crushing of said acoustic imaging particles in said subterranean formation results in said detectable acoustic signal or emission;
   d. detecting said detectable acoustic signal or emission caused by said fracturing or crushing of said acoustic imaging particles in said subterranean formation; and,
   e. using said detected acoustic signal or emission to provide information about said subterranean formation.

2. The method as defined in claim 1, further including a step of causing said outer coating to at least partially degrade or dissolve by exposing said acoustic imaging particles to certain environmental conditions to thereby reduce said crush strength of said acoustic imaging particles while in said subterranean formation.

3. The method as defined in claim 1, further including a step of mixing said acoustic imaging material with a proppant to form a slurry mixture and then pumping said slurry mixture into said subterranean formation, said acoustic imaging agent constituting 0.01-1.0 vol. % of said slurry mixture.

4. The method as defined in claim 2, further including a step of mixing said acoustic imaging material with a proppant to form a slurry mixture and then pumping said slurry mixture into said subterranean formation, said acoustic imaging agent constituting 0.01-1.0 vol. % of said slurry mixture.

5. The method as defined in claim 1, wherein said base particle constitutes 10-40 wt. % of each of said acoustic imaging particles.

6. The method as defined in claim 4, wherein said base particle constitutes 10-40 wt. % of each of said acoustic imaging particles.

7. The method as defined in claim 1, wherein said outer coating of said acoustic imaging particles includes one or more additives selected from the group consisting of reinforcing agent to increase said crush strength of said acoustic imaging particles, degrading agent to increase a degradation rate of said outer coating, and dense particle additive to increase a density of said acoustic imaging particles, said one or more additives constitute 0.001-30 wt. % of said outer coating, said one or more additives having a size of about 10 nm-1 mm.

8. The method as defined in claim 7, wherein a) said dense particle additive has a density of at least 1.7 g/cc and constitutes about 0.001-30 wt. % of said outer coating and is added in sufficient quantities to said outer coating to increase a density of said acoustic imaging particles by 0.5-5 g/cc, b) said reinforcing agent constitutes about 0.001-10 wt. % of said outer coating, said reinforcing agent increasing said crush strength of said acoustic imaging particles by 10-2000%, and c) said degrading agent constitutes about 0.001-10 wt. % of said outer coating, said degrading agent reducing a time of degradation of said outer coating by at least 5%.

9. The method as defined in claim 1, wherein said base particle has a diameter or average width of about 10Φ m to 100 mm.

10. The method as defined in claim 1, wherein said coating thickness of said outer coating is 10 nm to 1,000Φ m.

11. The method as defined in claim 1, wherein said detected acoustic signal or emission providing a) well fracture information including proppant placement in said subterranean formation, and/or b) well pressure information in said subterranean formation.

* * * * *